D. L. STERLING.
BANK CHECK AND STUB.
APPLICATION FILED MAY 28, 1921.

1,423,744.                                              Patented July 25, 1922.

Inventor
Don L. Sterling
By Jack Ashley
Attorney

UNITED STATES PATENT OFFICE.

DON L. STERLING, OF DALLAS, TEXAS.

BANK CHECK AND STUB.

1,423,744. Specification of Letters Patent. Patented July 25, 1922.

Application filed May 28, 1921. Serial No. 473,559.

*To all whom it may concern:*

Be it known that I, DON L. STERLING, a citizen of the United States, residing at Dallas, in the county of Dallas and State of Texas, have invented certain new and useful Improvements in Bank Checks and Stubs, of which the following is a specification.

This invention relates to new and useful improvements in bank checks and stubs.

The object of the invention is to provide a convenient means of segregating the odd cents of a checking account balance, and for depositing the same in a saving account, separate from the checking account.

A particular object of the invention is to segregate said savings deposit without altering or adding to the usual check, thus avoiding confusion and additional labor in handling said check; as well as confining knowledge of the savings account to the maker of the check and the bank. Another feature resides in the provision of a separate coupon or instrument carrying the amount of the savings deposit, which may be handled separately from the check; together with a stub on which the deposits of both the checking and savings accounts, may be kept and whereby the amount of the savings deposit may be easily completed, together with the balance in the checking account before and after the savings deposit is deducted.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is a face view of a sheet printed to form a stub, a savings coupon and a check, in accordance with my invention, and Fig. 2 is a view of the same filled out as in use.

In the drawings the numeral 10 designates an ordinary bank check which is separated from a coupon 11, by means of a line of perforations or the like 12, whereby the check may be readily detached from the coupon. The coupon is separated from a stub 13 by a line of perforations, indentations or the like 14. By means of the weakened lines 12 and 14, the check 10 may be readily severed or detached from the coupon and the coupon may be left attached to the stub to be detached later or it may be detached at the same time the check is removed. It is to be understood that the check, coupon and stub may be bound together in a suitable book in the form of leaves as is the customary practice.

The check 10 may be printed in any suitable manner such as is used in common practice and it is not considered necessary to enter into a detailed description of the same, other than to refer to the illustration in the drawings. One of the particular features of this invention is to preserve the conventional form of the check and not in any way to alter its general appearance or make it different from other checks commonly in use. However, this is not to be considered a limitation of the invention and the addition of data to the check 10 is within the scope of the invention.

The essential feature of the invention is the coupon 11 having for its main purpose the encouragement of saving. The coupon may be printed with the name of the banking institution and such other directory data as may be considered necessary. I have illustrated a printed panel 15 having provision for the writing therein, of figures indicating dollars and cents and designating the amount for which the coupon is written. A line 16 may be provided for a number and a line 17 for a date. A line or space 18 is provided for the signature of the person drawing the check 10, and indicating to whose saving account, the coupon is to be deposited. It is obvious that the printing and arrangement of the coupon permits of considerable variations.

The stub 13 is provided with a column 19 which has the usual spaces for entering the figures in connection with the usual checking account. To this column is added a space 20 with the designation "savings coupon" printed opposite. Under this space is another space 21 at the bottom of the column and opposite is printed "balance carried forward." After the check 10 has been written the amounts are entered in the column 19 in the usual manner and the account balanced, this balance being shown in the space 22 above the space 20. The amount of the savings coupon is written in the space 20 and subtracted from the balance in the space 22, the final total or balance being entered in the space 21.

As an illustration reference is made to Fig. 2. Here is shown a check drawn for $42.68, and signed in the usual manner. The amount of the check is entered in the column 19 and the balance in the space 22 is $167.32. Therefore, the amount to be saved is thirty-two cents, the odd cents. Thirty-two cents is written in the panel 15 of the coupon 11, and the coupon signed on the line 18. Thirty-two cents is entered in the space 20 and being subtracted from the amount in the space 22, gives a final balance of $167.00. The check 10 is detached from the coupon 11 and transmitted or delivered in the usual way. The coupon 11, may be left attached to the stub or it may be detached and mailed to the bank. Several coupons may be accumulated and taken to the bank to be deposited at one time. In fact the coupon may be used as most convenient as is obvious.

It is pointed out that the coupon may be printed in a distinguishing color, but this is not an essential feature. It is believed to be more convenient to interpose the coupon between the stub and the check. It will be seen that the check 10 and the coupon 11 may be handled separately by the bank and no additional bookkeeping or labor will be entailed in connection with the handling of the checks. The coupon will be handled by the savings department of the bank somewhat in the same manner as currency. By segregating the check and the coupon it is not necessary for the check 10 to be handled by both the savings and checking departments of the bank. As a rule the average depositor will accumulate several coupons before depositing the same in the bank, and this will greatly simplify the work in connection with the bookkeeping of the bank.

Various changes in the size and construction of the parts as well as modifications, may be made without departing from the spirit of the invention.

What I claim is:

1. A sheet of paper having spaced transverse lines upon which the same is adapted to be torn, said lines forming a check, a saving coupon, and a stub; said check being provided with the usual check form; said stub having data provided thereon including a line designated balance brought forward, a line designated amount deposited, a line beneath the last named line designated total, a line beneath the last named line designated amount of this check, a line beneath the last named line designated balance, a line beneath the last named line designated savings coupon, and a line beneath the last named line designated balance carried forward; said coupon being provided with data indicating in substance the name of the same bank occuring upon the check, a space designated for the reception of an amount of money, a line for the name of the payer and instructions to deposit the amount appearing upon the stub to the credit of the savings account of the depositor who signs the coupon.

2. A sheet of paper including a detachably connected check, savings coupon, and stub, said check being provided with the usual check form; said stub being provided with data including a line suitably designated for indicating the balance brought forward, a line beneath the first named line designated for the reception of the amount deposited, a line beneath the last named line designated for the total of the deposits, a line beneath the last named line designated for the amount of the check drawn, a line beneath the last named line having designations for the reception of the balance, a line beneath the last named line having a designation for the amount appearing upon the savings coupon, and a line beneath the last named line designated for the balance carried forward; said savings coupon having data indicating in substance the name and address of the bank with instructions to place to the credit of the savings account of the person signing the coupon the amount appearing upon the coupon, said data including a space designated for indicating the amount to be deposited, said coupon also having a designation indicating the date and number of the coupon.

3. A sheet of paper including a detachably connected check, savings coupon, and stub, said check being provided with the usual check form; said stub having designations thereon indicating the number of the stub corresponding to the number of the check, the total amount for which the check is drawn, the date upon which the check is drawn, the name of the payee upon the check, the balance brought forward, the amount of the check drawn, the balance, the amount of the savings coupon, and the total balance carried forward; said savings coupon having designations indicating in substance the name and address of the bank with the date the coupon is made, the number of the coupon corresponding to the number of the check, the amount for which the coupon is drawn, the name of the maker of the check, and instructions to deposit the amount of the coupon to the savings account of the maker of the check.

In testimony whereof I affix my signature.

DON L. STERLING.